Sept. 7, 1965   E. M. FISCHEL   3,204,467
PIVOT SUSPENDED GYRO WITH AUXILIARY MASS
Filed May 23, 1960   2 Sheets-Sheet 1
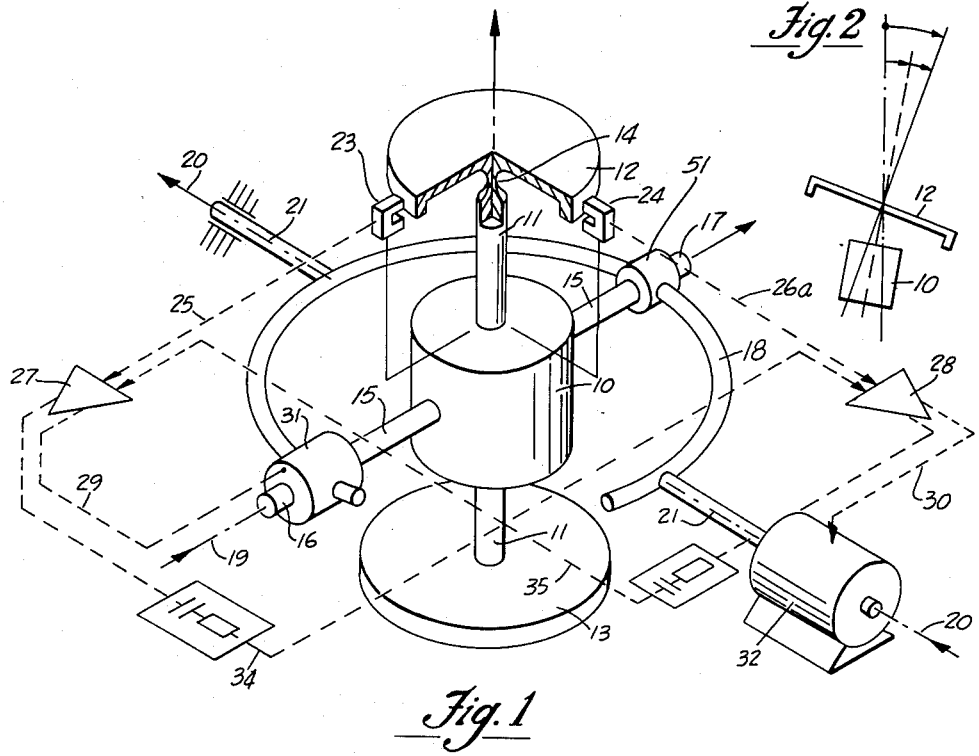
*Fig. 1*
*Fig. 2*
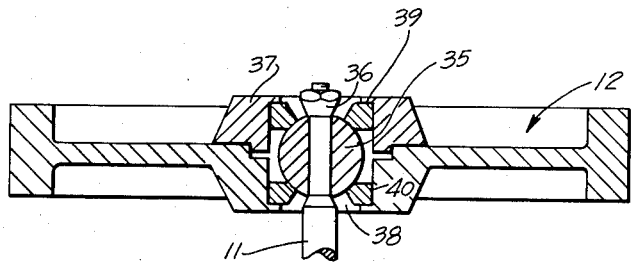
*Fig. 3*
E.M. FISCHEL
INVENTOR.
BY Andrew L. Bain
Sidney L. Faber
ATTORNEYS Sept. 7, 1965   E. M. FISCHEL   3,204,467
PIVOT SUSPENDED GYRO WITH AUXILIARY MASS
Filed May 23, 1960   2 Sheets-Sheet 2

E. M. FISCHEL
INVENTOR.

BY Andrew L. Bain
Sidney G. Faber
ATTORNEYS

United States Patent Office 3,204,467
Patented Sept. 7, 1965

3,204,467
PIVOT SUSPENDED GYRO WITH AUXILIARY MASS
Eduard M. Fischel, Caldwell, N.J., assignor to General Precision, Inc., Little Falls, N.J., a corporation of Delaware
Filed May 23, 1960, Ser. No. 31,206
1 Claim. (Cl. 74—5.37)

This invention generally relates to spacial attitude reference devices and more particularly to gyroscopes having two degrees of freedom.

According to the present invention there is provided a unique gyro design and construction embodying a novel electromechanical type of stability damping that enables each gyro of the platform to be constructed with two degrees of freedom yet embodying an accuracy and precision about each axis comparable to that obtainable from known single axis gyros of the precision types.

It is accordingly a principal object of the invention to provide a space stabilized attitude reference of less weight, smaller size, and reduced complexity over known devices.

A further object is to provide such a stabilized platform having fewer precision components than known devices.

Another object is to provide a two-degree-of freedom precision gyroscope.

A still further object is to provide such a gyro of reduced size and weight.

Still a further object is to provide such a gyro that is self-stabilizing about each sensitive axis.

Other objects and many additional advantages will be more readily understood by those skilled in the art after a detailed consideration of the following specification taken with the accompanying drawings wherein:

FIGURE 1 is a diagrammatic view, in perspective, illustrating a preferred gyro construction according to the present invention, FIGURE 2 is a diagrammatic sketch for illustrating the functioning of the gyro.

FIGURE 3 is an enlarged sectional view illustrating an alternative pivoting means for the upper gyro mass element in FIGURE 1.

Figure 4:
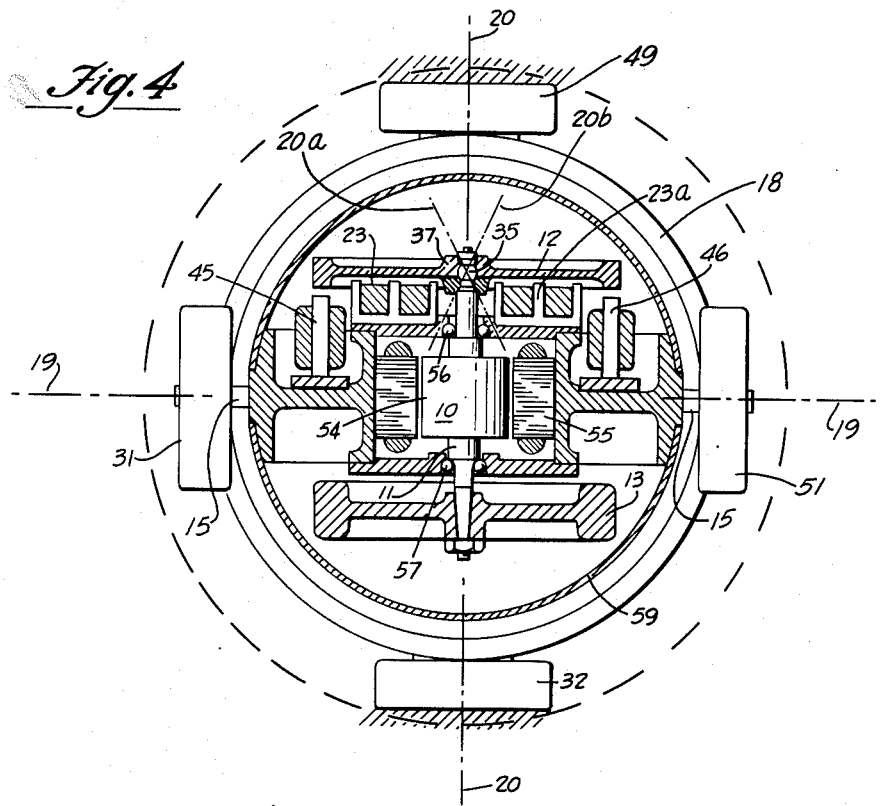
FIGURE 4 is a side view, in section, illustrating further details of the preferred gyro construction.

Referring now to the FIGURES 1 to 4 for a detailed consideration of the preferred gyro construction according to the invention, there is best shown in FIGURE 1 the various elements of the gyro comprising a gyro motor 10 for rotatably driving an elongated shaft 11, extending through opposite ends of the motor housing, and supporting upper and lower rotatable mass elements 12 and 13, respectively.

As shown, the upper and lower mass elements 12 and 13 are preferably symmetrically formed flywheels that are connected to opposite ends of shaft 11 at their central portions to rotate synchronously with the shaft 11 when the motor 10 is energized. The lower flywheel 13 is considerably larger and heavier than the upper flywheel 12 and is rigidly fastened to the shaft. The upper flywheel 12 on the other hand is connected to the shaft by a necked metal flexure 14 or like pivotable joint in such manner that the upper wheel 12 is connected to and rotatably driven by the shaft 11 but free to flex or tilt at joint 14 about any axis normal to the longitudinal axis of the drive shaft 11.

For supporting the gyro unit with two degrees of freedom, the gyro motor 10 is rigidly carried on a shaft or pair of shafts 15 whose end portions 16 and 17 are rotatably supported by a large diameter ring 18 in such manner that the gyro motor 10, shaft 11 and inertia wheels 12 and 13 are pivotable as a unit about the axis 19 of shaft 15, thereby providing the gyro with a first degree of freedom about this axis 19 transverse to the spin axis of shaft 11. For providing the gyro with a second degree of pivoting freedom, the ring 18 is, in turn, pivotably supported for rotation about transverse axis 20 by means of a pair of shafts 21, 21, that are connected to opposite diametral positions on the ring and spaced equally between the end locations 16 and 17 of first pivotable shaft 15. The opposite ends of shafts 21, 21 are in turn, pivotally mounted in the gyro housing (not shown) whereby the shafts 21, 21 may rotate with respect to the housing about axis 20 to provide the gyro with its second degree of freedom.

In operation, energization of the gyro motor 10 rapidly rotates the spin shift 11 which in turn drives the upper and lower inertia wheels 12 and 13 at high speed to define a substantially stable axis in space as a result of the gyro inertia of the flywheels. Since the lower inertia wheel 13 is considerably larger than the upper flywheel and is rigidly affixed to the spin shaft 11, the orientation or attitude of the spin shaft 11 is controlled by the gyro inertia of the spinning lower wheel and this orientation is maintained substantially constant despite deviation of the housing about either or both axes 19 or 20. However since the lower inertia wheel 13 possesses a large moment of inertia and is rotatably supported by bearings (as best shown in FIGURE 4) the gyro would normally tend to drift and deviate slowly from its original position in space due to any weight unbalance, uneven bearing wear or outside influences. The lower wheel provides a higher dynamic moment of inertia, so that it is not influenced by external forces. Consequently to correct for these conditions and provide the accuracy and sensitivity needed for precision applications the upper inertia wheel 12 and a pair of follow-up correcting loops are employed to continuously correct the orientation of the gyro and maintain its attitude substantially constant within the necessary high degree of precision needed. If the upper flywheel 12 is moved out of alignment with the lower flywheel, the outside loop tends to force the pivoted flywheel back into its neutral position.

Returning to FIGURE 1 for a consideration of what may be termed the vernier or precision correction of the gyro, the upper rapidly rotating inertia wheel 12 serves to define its own stable spin axis in space by reason of its spinning gyroscopic properties and it is, in turn, provided with two degrees of freedom with respect to drive shaft 11 by reason of the flexure or pivoting connection 14 therebetween. Consequently, should the orientation or special attitude of lower flywheel 13 and shaft 11 tend to deviate with respect to the spin axis of upper inertia wheel 12, the spin axis of wheel 12 remains substantially constant and the pivoting action between the two members is permitted by flexure of joint 14. Upon such deviation occurring, as illustrated in FIGURE 2, pickoff means, such as 23 and 24, supported by the motor housing 10, as shown in FIGURE 1 detect this deviation about either or both axis and transmit electrical signals over lines 25 and 26, respectively, to the related amplifiers 17 and 28 which, in turn, transmit an amplified signal over lines 29 or 30 to excite the torque motors 31 and 32. The torque motor 31 is connected to pivot shaft 15 with respect to ring 18 and hence upon receiving energization from amplifier 27 operates in a direction to pivot the gyro 10 and shaft 11 about axis 19. Upon receiving this torque, the inertia of the lower flywheel 13 causes the gyro to precess about transverse axis 20 whereupon the gyro precesses pivoting spin shaft 11 about axis 20 until the signal from pickoff 23 is returned to null indicating that spin shaft 11 has been again brought into axial alignment with the spin axis of upper flywheel 12. FIGURE 4 shows at 20a and 20b, the angular position of the axis of rotation or spin axis of the upper flywheel 12 when it is tilted about the ball joint. In a similar manner, deviation of spin shaft 11 and lower flywheel 13 about axis 19 results in pickoff 24 energizing amplifier 28 and torque motor 32 whereupon the torque applied about axis 20 operates to cause precession of the lower flywheel 13 and shaft 11 about axis 19 until null balance between the upper and lower flywheels is again obtained.

To increase the rate of damping of the system, an additional output is taken from amplifier 27 and differentiated and transferred to the input of amplifier 28 is the other loop and a similar output from amplifier 28 is differentiated and transferred to the input of amplifier 17. Correction of the upper flywheel is made by the outside loop.

FIGURE 3 illustrates an alternative construction for pivotally connecting the upper flywheel to the spin shaft 11 with two degrees of freedom. As shown, rather than providing a solid flexure suspension 14 between the members as in FIGURE 1, there is provided a universal friction ball joint connection therebetween wherein a highly polished ball of steel or the like 35 is centrally fitted at the end of the spin shaft and rigidly retained in place by means of a locking nut 36. The hub portion 37 of the flywheel 12 is divided into two parts having a central opening 38 therethrough containing upper and lower bearing rings 39 and 40 that are frictionally slidable over the ball to permit pivoting of the flywheel 12 with respect to the shaft 11, and rotational play between the shaft and the flywheel. There is always some slippage between the flywheel 12 and the shaft, due to ball joint. The friction between the surface of the ball and the rings 39, 40 is a function of the damping force applied to the rings. To rotatably drive the flywheel 12 under control of the rotation of the shaft 11, the two parts of the hub are connected together in such manner as to be adjustable further together by means of screws or the like (not shown) to compress the rings 39 and 40 between the hub and ball 35. In actual practice, there would be a considerable amount of play, between the motor driven shaft 11 and the flywheel 12. As an example, under certain operating conditions, the motor shaft would be rotated at 24,000 r.p.m. with the flywheel actually rotating at 18,000 r.p.m.

This loss may be expressed as:

Precession friction:
$$\frac{\text{precession motion}}{\text{flywheel rotation}}$$

The precession friction is relatively insignificant. The rings 39 and 40 may be of rather porous plastic or the like soaked in oil to retain the oil in tiny pockets throughout the rings or may be of cast iron with oil impregnated tiny pockets therethrough.

The friction ball 35 shown in FIGURE 3 is not of magnetic composition, as the very friction provides the necessary gripping force. When the ball joint shown in FIGURE 3 is used, there is no flexural restoring force, so that no magnetic force is required. However, a small magnetic force may be required in order to compensate for small restoring force due to friction between the ball and the rings.

Figure 5:
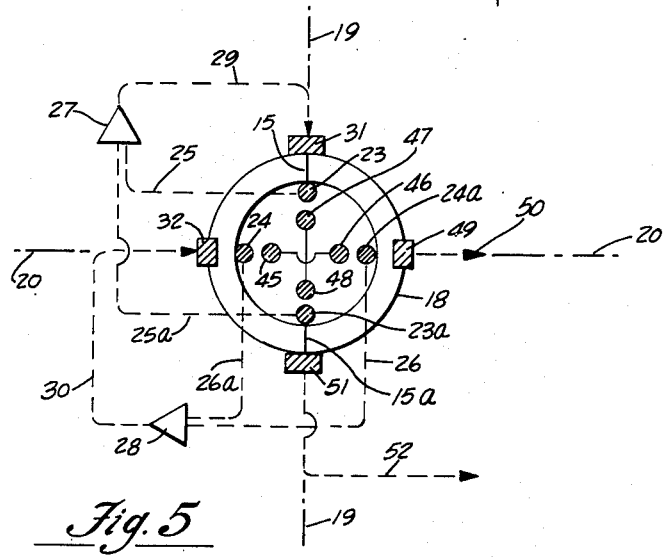
FIGURE 5 is an electrical schematic illustrating the feedback loop connections for the gyro.

The electrical schematic drawing of FIGURE 5 illustrates some further details of the preferred gyro construction. As shown, there may also be included an aditional pair of torque motors 45 and 46 located on opposite undersides of the upper flywheel 12 and oriented along axis 20—20 to tilt the flywheel 12 in response to command signals (not shown) thereby to change the stable orientation of the gyro spin axis (defined by spin shaft 11) as desired along one axis as shown in FIGURE 4. A similar pair of torque windings or motors 47 and 48 are located along axis 19–19 to likewise tilt the upper flywheel 12 along a second axis whereby by means of the two pairs of torque windings the orientation of the gyro may be commanded to assume different special attitudes as shown in FIGURES 1 and 4, since as discussed above in greater detail, the orientation of the gyro follows the position of the upper flywheel 12 through the action of the follow-up loops and torque motors 31 and 32.

For producing output signals from the gyro indicating relative displacement between the gyro stable axis and the housing about two axes, a pair of pickoffs 49 and 51 are provided with pickoff 49 being connected between the gimbal ring 18 and the housing (not shown) to produce a signal over line 50 corresponding to deviation about axis 20 and with pickoff 51 being connected between gimbal ring 18 and shaft 15 (see FIGURE 1) to produce a signal over line 52 corresponding to deviation about axis 19.

FIGURE 4 illustrates some preferred constructional details of the gyro and the manner of their interconnection. As shown, the gyro motor includes a central rotor 54 centrally supported for rotation in a frame carrying the motor stator windings 55, by means of upper and lower bearings 56 and 57 rotatably supporting the projecting spin shaft 11 suitably connected to the rotor 54. The upper and lower flywheels 12 and 13 are in turn connected near opposite ends of spin shaft 11 and adapted to be driven thereby as discussed above. Underneath the upper flywheel 12 is positioned the pickoffs 23 and 23a supported on the stator frame for detecting the relative displacement between the upper flywheel 12 and spin shaft 11 about axis 20 and near the opposite outside flanges of the flywheel 12 are located the torque windings 45 and 46 that are also supported on the stator frame and operate to exert a turning torque on the flywheel 12 about axis 19.

For the purpose of reducing windage losses as well as preventing contamination of the rotating parts and bearings by dust and the like, the gyro motor 10, spin shaft 11, flywheels 12 and 13 as well as the inner pickoffs and torque windings may all be enclosed and sealed within a spherical shell 59; which may be evacuated, if desired, and a low friction gas substituted therein. Where air is left in the spherical shell 59, it provides an additional restoring torque, which should be avoided, if possible. An essential feature of the device is to eliminate all extraneous forces. The sealed shell 59 is, in turn, supported by shafts 15—15 whose opposite ends are rotatably carried by the ring 18 for displacement about axis 19. The torque motor 31 is carried by the ring 18 and when energized produces a rotative torque upon shaft 15, and pickoff 51 is also supported by the ring 18 and detects any rotative deviation of shaft 15 with respect to gimbal ring 18 about axis 19.

The gimbal ring 18 is, in turn, rotatably supported with respect to the housing along axis 20, and the torque motor 32 and pickoff 49, respectively, exert a turning torque on the ring 18 about this axis and detect any deviation about this axis.

Modifications of the preferred gyro construction are considered within the skill of those versed in the art in the light of the present invention and consequently this invention should be considered as being limited only according to the following claim appended hereto.

What is claimed is:

A gyro assembly comprising:
  a gyro motor including a spin axis drive shaft having oppositely extending end portions;
  a gimbal ring mounted for pivotal movement about a first axis co-planar with said spin axis;
  trunnions mounting said motor on said gimbal ring for pivotal movement relative thereto about a second axis perpendicular to both said first axis and said spin axis;
  respective torquing means individually and jointly operative to apply torque to said gimbal ring and to said trunnions about said first and second axes, respectively;

an inertia member rigidly fixed to one end portion of said drive shaft for coaxial rotation therewith;

a second inertia member;

means pivotally mounting said second inertia member on the other end portion of said drive shaft for rotation therewith and for angular displacement of its axis of rotation with respect to said spin axis in planes containing said spin axis;

pickoff means adjacent said second inertia member for sensing and generating electrical signals representative of angular displacement of the axis of rotation of said second inertia member and means for operating said torquing means in response to said electrical signals to oppose said angular displacement.

References Cited by the Examiner

UNITED STATES PATENTS

| 2,815,584 | 12/57 | Watson | 74—5.6 X |
| 2,852,943 | 9/58 | Sedgfield | 74—5.7 |
| 2,936,627 | 5/60 | Wing et al. | 74—5.34 |

FOREIGN PATENTS

| 509,447 | 8/20 | France. |
| 1,090,872 | 10/54 | France. |

MILTON KAUFMAN, *Primary Examiner.*

BROUGHTON G. DURHAM, *Examiner.*